R. M. VICK.
ROLLING PIN.
APPLICATION FILED JAN. 28, 1909.
950,775.
Patented Mar. 1, 1910.
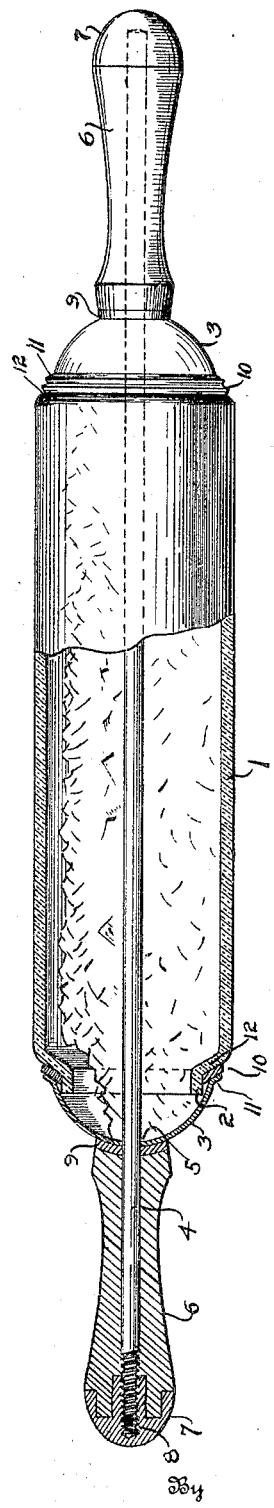
Witnesses
Jos. J. Hosler.
Sylvia Boron.
Inventor
Rollo M. Vick
By Bond + Miller
Attorneys

UNITED STATES PATENT OFFICE.

ROLLO M. VICK, OF ALLIANCE, OHIO.

ROLLING-PIN.

950,775.     Specification of Letters Patent.     Patented Mar. 1, 1910.

Application filed January 23, 1909. Serial No. 474,857.

*To all whom it may concern:*

Be it known that I, ROLLO M. VICK, a citizen of the United States, residing at Alliance, in the county of Stark and State of Ohio, have invented certain new and useful Improvements in Rolling-Pins, the object of which is to provide a rolling-pin well adapted as a sanitary article, and a further object is to provide a rolling-pin that will not become heated or, in other words, one that will remain cool during the time that it is in use.

In rolling dough it is of importance that the rolling-pin coming in contact with the dough be cool and more especially in the working of pie dough, owing to the fact that if the rolling-pin is warm the heat or more specifically the warmth has a tendency to injure the ingredients in the dough. It is well understood that butter, lard or other like materials are used for the purpose of shortening the dough. If a warm rolling-pin is applied the heat or warmth has a tendency to cause the particles of butter or lard to move toward the surface of the dough upon which the rolling-pin is applied therefore, leaving the center or inner portion of the sheet of dough without the necessary amount of shortening material and when the dough is baked the center portion has a tendency to become hardened and tough.

In the accompanying drawing, the figure shows the rolling-pin partially in section.

In the accompanying drawing, 1 represents the rolling-pin proper which is formed hollow and cylindrical and preferably made of glass or other suitable material and of any desired size. The ends of the cylinder or rolling-pin 1 are provided with the reduced portions 2, upon which are located the inclosing caps 3, which inclosing caps are preferably formed of metal.

For the purpose of providing suitable handles at the ends of the rolling pin proper the rod 4 is provided, which rod is located through the apertures 5 formed in the caps 3 and upon which rod are mounted the handles 6, to which handles are securely attached in any convenient and well known manner the metal tips or caps 7, which caps are provided with the screw threaded sockets 8, whereby the handles are securely attached to the rod 4. The inner ends of the handles are seated against the gaskets 9, which gaskets are located upon the caps 3 as illustrated in the drawing.

For the purpose of providing a water tight joint between the ends of the rolling-pin 1 and the caps 3, the gaskets 10 are provided, which gaskets are located between the cap flanges 11 and the inclined flanges 12 formed upon the rolling-pin 1.

The rolling-pin is formed hollow for the purpose of placing ice within whereby the pin is kept in a cool condition.

It will be understood that it is necessary to remove one of the caps 3 from time to time in order to empty and refill the rolling-pin proper and in order to provide for this one of the handles 6 can be removed from the rod 4 after which the particular cap 3 can also be removed and the parts replaced after the rolling-pin has been supplied with ice or other material.

Having fully described my invention, what I claim as new and desire to secure by Letters Patent, is—

As an improved article of manufacture, a rolling pin formed of glass and hollow, said rolling pin provided with inclined end flanges, a rod located through the rolling pin and provided with extended portions having screw threaded ends, handles mounted upon said extended portions and provided with caps having screw threaded apertures, caps mounted upon the rods, said caps provided with inclined flanges, the said inclined flanges corresponding with the inclination of the flanges formed upon the hollow rolling pin and gaskets located between the inclined flanges of the rolling pin and caps respectively, and gaskets located against the inner ends of the handles and the outer faces of the caps, the ends of the handles adapted for swinging contact upon the gaskets located upon the caps, substantially as and for the purpose specified.

In testimony that I claim the above, I have hereunto subscribed my name in the presence of two witnesses.

ROLLO M. VICK.

Witnesses:
   C. C. DAVIDSON,
   LENA BUEHLER.